Nov. 23, 1926.

J. DE HAES 1,608,467

TIMING MECHANISM FOR CAMERAS

Filed Dec. 22, 1924

Jerome De Haes,
INVENTOR

BY Victor J. Evans
ATTORNEY

WITNESS:

Patented Nov. 23, 1926.

1,608,467

UNITED STATES PATENT OFFICE.

JEROME DE HAES, OF CHICAGO, ILLINOIS.

TIMING MECHANISM FOR CAMERAS.

Application filed December 22, 1924. Serial No. 757,486.

This invention relates to new and useful improvements in timing mechanisms for cameras and more particularly to a device which may be applied to several types of well-known cameras in use at the present time and adapted to cooperate with the usual spring actuated shutter for controlling the movement of the shutter when taking time exposures.

Another object of my invention is the provision of a timing mechanism for cameras so arranged and adapted to cooperate with the spring actuated shutter whereby to retain the shutter in an open position a predetermined length of time and release the shutter for closing movement as soon as the time is up.

A further object of my invention is the provision of a device of the above character which may be quickly and readily installed and used in connection with various well-known types of cameras in use at the present time and operates automatically for retaining the spring actuated shutter in an open position and releasing the same in a predetermined length of time.

With the above and other objects in view, the invention consists in the novel features of construction, the combination and arrangement of parts hereinafter more fully set forth, pointed out in the claims and shown in the accompanying drawings, in which:

Figure 1:
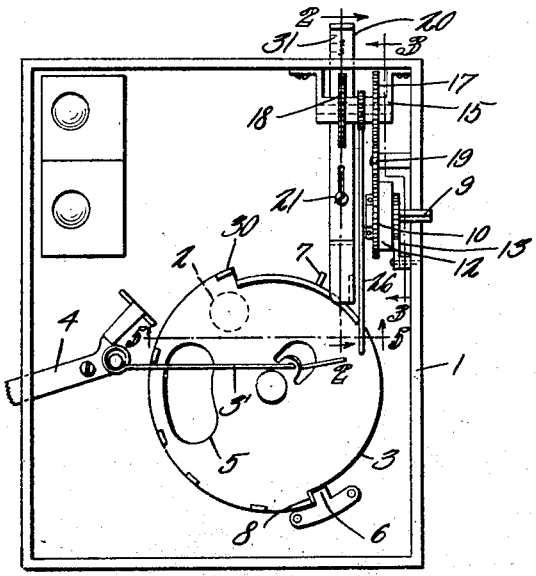
Fig. 1 is a front elevation of a camera with the front end removed, illustrating my improved timing mechanism.
Figure 3:
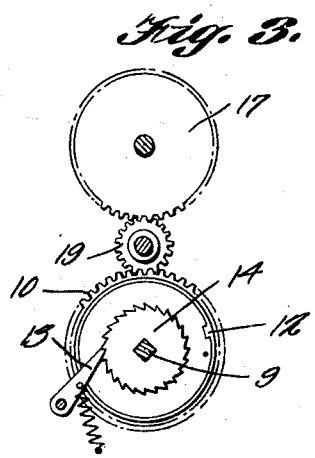
Fig. 3 is a sectional view on the line 3—3 of Fig. 1.

Referring more particularly to the drawings the numeral 1 indicates a camera of the box type having the usual exposure opening 2 and spring actuated rotatable shutter member 3 which is actuated through the oscillatory movement of the lever 4. The shutter 3 is provided with the arcuate opening 5 which is adapted to be brought into alignment with the opening 2 in the end of the camera for exposing a film in the rear of the camera.

The usual stop 6 is provided and the periphery of the shutter 3 is formed with stop shoulders 7 and 8 adapted to engage the stop member 6 for limiting the rotative movement of the shutter plate in either direction.

My improved timing mechanism comprises a crank shaft 9 mounted in suitable bearings adjacent one side wall of the camera and mounted upon the shaft 9 is a spring actuated gear 10, the movement of which is controlled by the spring 11 arranged within a housing 12. The spring 11 is placed under tension through any suitable means for imparting rotative movement to the shaft 9 and after the spring has been placed under tension the spring pressed pawl 13 engaging the ratchet wheel 14 on the shaft 9 will retain the spring under tension.

Supported upon a suitable hanger 15 suspended from the top of the body 1 is a shaft 16 upon which are mounted spaced gears 17 and 18, the gear 17 having connection with the gear 10 through a pinion 19 whereby upon movement of the gear 10 through the tension of the spring 11, the gear 17 will be rotated to impart movement to the shaft 16 and rotate the gear 18.

Figure 2:
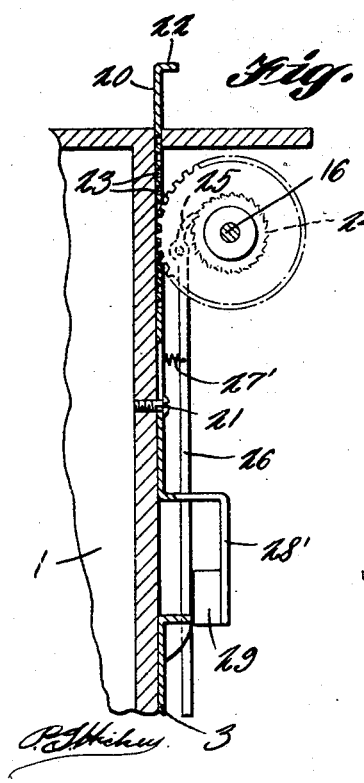
Fig. 2 is a sectional view on the line 2—2 of Fig. 1.
Figure 4:
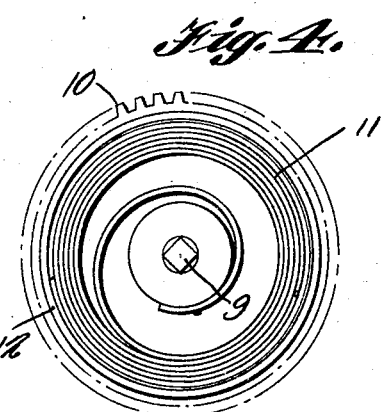
Fig. 4 is an elevation of the spring actuated gear.
Figure 5:
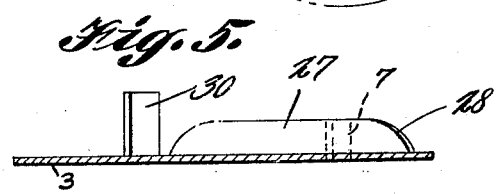
Fig. 5 is a detail section on the line 5—5 of Fig. 1.

The usual time slide 20 is mounted upon a guide pin 21 with the upper end of the slide extended at right-angles as shown at 22 to limit the inward movement of the slide. The slide 20 is provided with a plurality of notches 23 adapted to be engaged by the teeth of the gear 18 for reciprocating the slide upon rotation of said gear. The gears 17 and 18 are normally retained against movement through the action of the spring 11 by means of a ratchet 24 engaged by a pivoted pawl 25 which is actuated by means of a rod 26 connected to the pawl and extending parallel with the slide 20. The lower end of this rod 26 is adapted to ride upon an outstanding flange 27 formed on the shutter plate 3 and has cam surfaces 28 at each end thereof so that the same will engage beneath the rod 26 upon turning movement of the plate and move the rod laterally away from the shutter plate for disengaging the pawl 25 from the ratchet 24, this movement releasing the spring 11 to permit the rotation of the gears 17 and 18. The pawl 25 is normally retained in engagement with the ratchet 24 by means of a spring 27' connected to the rod 26 and to the body of the camera as shown in Figure 2.

The inner end of the slide 20 is provided with an angular portion 28' having a stop flange 29 formed upon its inner end which is normally projected below the pathway of an outstanding arm 30 carried by the shutter plate 3, but when it is desired to expose the film a certain length of time, the slide 20 is moved upwardly to a predetermined position, the position being indicated by the graduations 31 on the upper end of the slide as shown in Figure 1 in accordance with the time to which it is desired to expose the film. The above movement will bring the flange 29 in the pathway of the arm 30, causing the arm to strike the flange 29 and retard the rotative movement of the plate 3 retaining the opening 5 in the plate in alignment with the opening 2, it being understood that the rotative movement of the plate 3 will actuate the rod 26 and release the pawl 25 so as to permit rotation of the gears 17 and 18 so that when a predetermined time has lapsed the slide 20 will have been moved downwardly to its normal position through the rotation of the gear 18, releasing the arm 30 and permitting the plate 3 to continue in its rotative movement until the stop shoulder 7 engages the stop 6, this movement carrying the opening 5 beyond the opening 2 and completing the exposure.

It will be understood that the ratio of the gears which connect the housing 12 with the gear 18 is such as to provide the proper movement of the slide 20 in order to release the shutter 3 when a predetermined time has elapsed or the time indicated on the slide 20 above the top of the body. The rotatable shutter 3 is actuated through the connection of the spring 3' to the lever 4 whereby upon oscillation of the lever in either direction the tension of the spring 3' will rotate the shutter plate and it will be noted that when the slide 20 is in a raised position the flange 29 thereon will be brought into the path of the arm 30 and retard the spring action of the member 3 so that when the flange 29 is disengaged from the arm 30 the action of the spring 3' will impart further movement to the plate 3 and bring one of the stop shoulders thereon into engagement with the stop 6.

As shown in Figure 1, the slide 20 has been set for a three-second exposure. As soon as the lever 4 is moved in an upward direction the shutter 3 will be rotated to bring the opening 5 into alignment with the opening 2. This movement will cause the flange 27 to be moved beneath the lower end of the rod 26 and release the pawl 25 to permit movement of the gears 17 and 18, moving the slide downwardly until the flange 29 moves out of the pathway of the arm 30 and permitting the shutter 3 to move to a closed position.

It will be apparent from the foregoing that I have provided an improved device which can be quickly and readily applied to well-known makes of box cameras and other types wherein the correct timing of exposures may be carried out and the exposure closed as soon as a predetermined length of time has lapsed.

While I have shown and described the preferred embodiment of my invention, it will be understood that various changes and alterations may be made without departing from the spirit of the invention or the scope of the appended claims.

Having thus described my invention, what I claim is:

1. In camera timing mechanism, a shutter, means for operating said shutter, a timer member slidably mounted for movement toward and away from the shutter, said member being provided with a flange extending toward the shutter and the shutter having a stop member disposed to contact with said flange and hold the shutter open when the timer member is in operative relation to said shutter, said member being adjustable toward and away from the shutter, and means controlled by movement of the shutter into operative position for moving the timer member in proper direction to move said flange out of contact with said stop member releasing the shutter and permitting closing thereof.

2. In camera timing mechanism, a shutter, means for operating said shutter, a timer member slidably mounted for movement toward and away from the shutter transversely thereof, said member being provided at its inner end with a longitudinally extending flange extending inwardly toward the shutter and the shutter having a stop member disposed to contact with the flange to arrest movement of the shutter when it is in open position, and means controlled by movement of the shutter into open position for moving the timer member in proper direction to move the flange out of contact with the shutter stop member and release the shutter permitting closing thereof.

3. In camera timing mechanism, a shutter, means for operating said shutter, a timer member slidably mounted for movement toward and away from the shutter transversely thereof, said member being provided at its inner end with a longitudinally extending flange extending inwardly toward the shutter and the shutter having a stop member disposed to contact with the flange to arrest movement of the shutter when it is in open position, a uni-directional gear, driving connections between said gear and the timer member, a motor, driving connections between said motor and the gear, means for normally holding the motor against operation while permitting manual adjustment of the timer member in the direction in which it is operated by the gear, and means actuated by movement of the shutter into open position for releasing the motor.

4. In combination a shutter plate, a lateral arm carried thereby, a movable slide, a laterally projecting flange on the slide at its inner end normally disposed out of the path of said arm, a series of graduations at the outer end of the slide, said slide being manually set to represent a predetermined length of time whereby to move the flange thereon into the path of the arm on the plate and automatic means actuated through rotation of the plate for moving the slide whereby to remove the flange thereon out of the path of the arm upon the lapsing of the predetermined length of time.

In testimony whereof I affix my signature.

JEROME DE HAES.